Feb. 6, 1951 H. C. CLATFELTER 2,540,568
TOOLHOLDER
Filed May 29, 1948 2 Sheets-Sheet 1
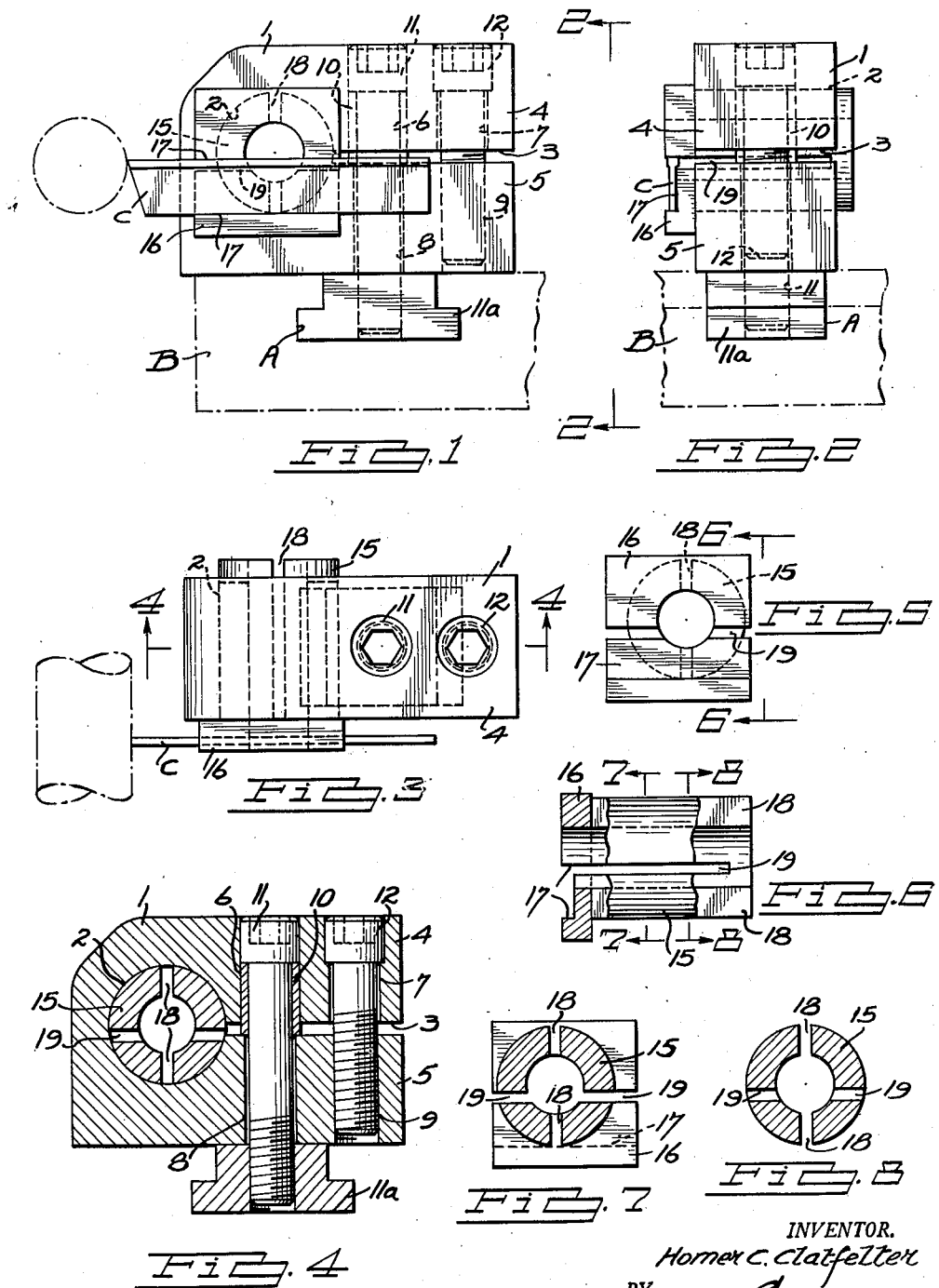
INVENTOR.
Homer C. Clatfelter
BY
Grant Baldwin
Attorney.

Feb. 6, 1951     H. C. CLATFELTER     2,540,568
TOOLHOLDER

Filed May 29, 1948                                 2 Sheets-Sheet 2

INVENTOR.
Homer C. Clatfelter.
BY
Attorney

Patented Feb. 6, 1951

2,540,568

UNITED STATES PATENT OFFICE 2,540,568

TOOLHOLDER

Homer C. Clatfelter, Novi Township, Oakland County, Mich.

Application May 29, 1948, Serial No. 30,029

2 Claims. (Cl. 82—36)

This invention relates to improvements in toolholders for lathes, automatic machines and the like. It is an object of the invention to provide a toolholder which is relatively cheap and simple to manufacture, and which may be employed for supporting any one of a wide range of tools.

Another object of the invention is to provide a toolholder including an apertured post split horizontal from the aperture to one extremity, means extending through both split portions for securing the post upon a rest, and other means also extending through both split portions for drawing the latter and opposite sides of the aperture toward one another to firmly engage the shank of a tool supporting member in the aperture.

Further objects of the invention are to provide a toolholder wherein the tool supporting member and its shank, which is tubular are also split so that when the split portions of the post are drawn together to grip the shank the latter is also compressed to rigidly engage a tool in the supporting member; and wherein the shank of the tool supporting member is rotatable in the aperture when the means holding the shank immovable in the aperture is loosened to permit adjustment of the tool.

Having thus briefly stated some of the objects and advantages of the invention I will now describe it in detail with the aid of the accompanying drawings, in which:

Figure 1 shows a side view of the invention supporting a parting tool,

Figuer 2 is an end view taken on the line 2—2 of Figure 1, and

Figure 3 is a plan view thereof.

Figure 4 is a section on the line 4—4 of Figure 3.

Figure 5 is a front view of the tool supporting member,

Figure 6 is a side view thereof taken on the line 6—6 of Figure 5, and

Figures 7 and 8 are sections on the lines 7—7 and 8—8 respectively of Figure 6.

Figure 9:
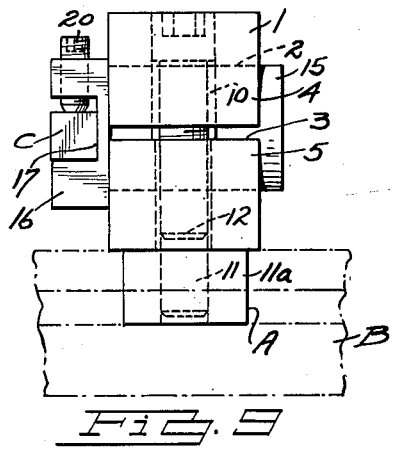

Figure 9 is an end view of a slightly modified form of toolholder, and

Figure 10:
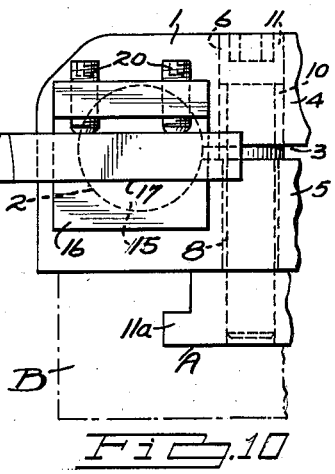

Figure 10 is a side view thereof.

Figure 11:
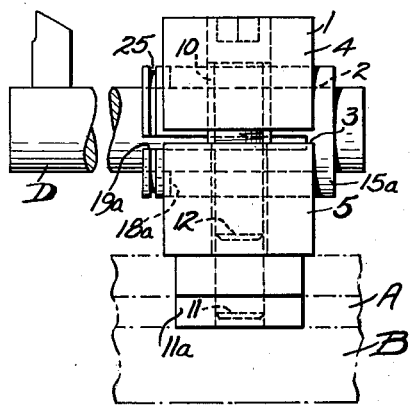
Figure 12:
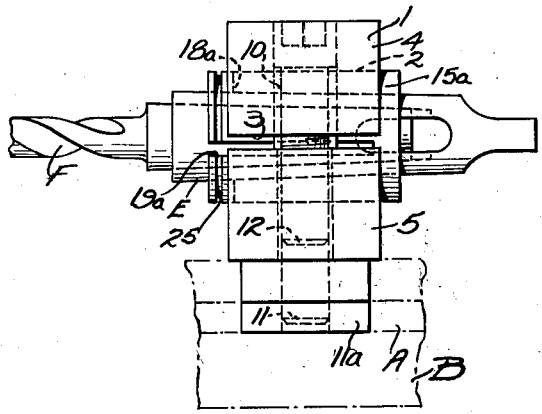
Figure 13:
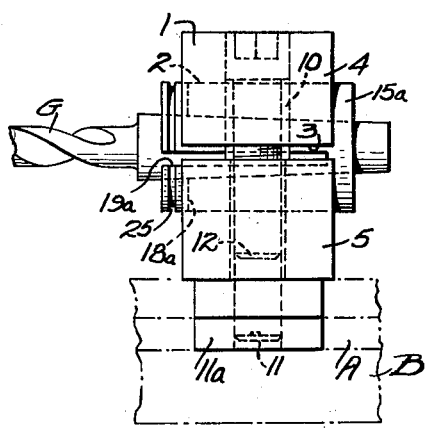

Figures 11 to 13, inclusive, show a further modified form of my toolholder wherein the tool is held in the bore of the shank of the tool supporting member; in Figure 11 a boring bar is shown mounted therein; in Figure 12 an adapter carrying a drill is mounted in the tubular shank; and in Figure 13 a drill is directly supported in the said shank.

Figures 14, 15:
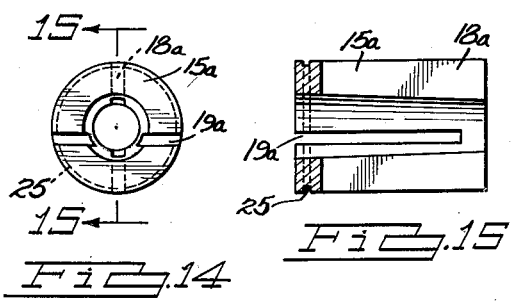

Figure 14 is an end view of the modified form of tool supporting member shown in Figures 11 to 13, and Figure 15 is a section on the line 15—15 of Figure 14.

Referring to the drawings, 1 designates a post having an aperture 2 formed horizontally therethrough adjacent one extremity, and a slot 3 substantially in alignment with the axis of the aperture 2 which extends from the latter to the opposite extremity of the post, thereby dividing the latter for the major portion of its length into an upper portion 4 and a lower portion 5. Formed vertically through the upper portion 4 are two openings 6 and 7 so located that an imaginary line drawn through their axes extends at right angles to the axis of the aperture 2. The opening 6, nearer the aperture 2 than the opening 7, is of uniform diameter throughout its length while the opening 7 is preferably counterbored from its upper extremity. Formed through the lower portion 5 of the post in alignment with the openings 6 and 7 are other openings 8 and 9 respectively. The opening 8, which is a clearance opening, is usually smaller than the opening 6, and the opening 9 is internally threaded. Mounted in the opening 6 and having its lower extremity resting upon the upper face of the lower portion 5 of the post is a bushing 10 through which a bolt 11 extends. The head of this bolt is usually located in the upper extremity of the opening 6, and in threaded engagement with the lower extremity of the bolt 11 is a nut 11a formed to engage a slot, such as the T-slot A formed in a compound rest indicated at B. Consequently by tightening the bolt 11 the post is held immovable upon the rest B without drawing the upper and lower portions 4 and 5 of the post together. The tool supporting means includes a shank 15 which extends through the aperture 2 and may be held immovable therein by the screw 12 which passes through the opening 7 and is in threaded engagement with the opening 9. The counterbore at the upper extremity of the opening 7 is provided to receive the head of the screw 12.

In the embodiment shown in Figures 1 to 10, the tool supporting member includes a retainer 16 integral with and positioned on one extremity of the shank 15, and formed across the outer face of the retainer is a groove 17 to receive a cutting tool C, such as a parting tool shown in Figures 1 to 3, inclusive, or a tool bit as shown in Figures 9 and 10. In the construction shown in all the above mentioned views except Figures 9 and 10 the shank 15 is tubular throughout its length and this tubular opening also extends through the retainer 16. Formed substantially diametrically through the tubular shank 15 from its extremity remote from the retainer 16, and terminating substantially flush with the rear of the said retainer, are slots 18 which are disposed at right angles to the groove 17; and formed through the retainer from the base of the groove 17 and parallel with opposite sides of the latter are other slots 19 which terminate a short distance from the extremity of the shank 15 remote from the retainer 16. Moreover it is frequently preferable that one margin of the groove 17 coincides with one side of both the slots 19. Consequently when the shank 15 is inserted in the aperture 2 and the screw 12 is tightened not only are the post portions 4 and 5 drawn toward one another so that opposite sides of the aperture 2 firmly engage the shank 15, but the inward pressure exerted upon the periphery of the shank 15 causes the said shank to exert gripping action upon opposite sides of the tool C mounted between opposite sides of the groove 17. And incidentally if a circular object, such as a tool shank, were inserted in the bore of the shank 15 the latter would exert inward pressure around substantially the entire periphery of the said circular object so that the latter would be held immovable.

In the modification shown in Figures 9 and 10 the shank 15 of the tool supporting member is solid so that while it is firmly engaged in the aperture 2 of the post when the screw 12 is tightened the spacing between opposite sides of the groove 17 (which is deeper) is not changed by manipulation of the said screw. In this instance set screws 20 are threaded through the retainer 16 and extend into the groove 17 to bear against one side of the tool bit C and force the opposite side of the latter into binding engagement with the opposite side of said groove.

In the modification shown in Figures 11 to 15, inclusive, the tool supporting member consists merely of a tubular shank 15a and the retainer is dispensed with since it would only be superfluous. The tubular shank 15a is again mounted in the aperture 2 in the post 1, and has similarly arranged aligned slots 18a and 19a therein extending from opposite extremities, so that when the screw 12 is tightened the bore of the shank is contracted to grip the periphery of a tool extending therethrough. When the tool supporting member has a retainer integral with the shank, as in Figures 1 to 10, inclusive, the bore of the latter is usually of uniform diameter throughout its length, however when a tool is to be mounted therein the bore may be either straight or taper to accommodate the tool to be held therein. Figure 11 shows a boring bar D of uniform diameter throughout its length mounted in a straight bored shank 15a. In Figure 12 an adapter E having a tapered shank is shown mounted in one of my tubular shanks 15a the bore of which is correspondingly tapered. The adapter in this case supports a drill F. Figure 13 shows a taper shank drill G directly supported in the tapered bore of one of my tubular shanks 15a.

When the tool supporting member consists only of a split tubular shank 15a, in order to facilitate its removal from the aperture 2 of the post, the said shank is preferably longer than the aperture and projects from both extremities thereof. Moreover an annular recess 25 may be provided around the shank adjacent one extremity thereof for the same reason.

While in the foregoing the preferred embodiments of the invention have been described and shown, it is understood that other alterations and modifications may be made thereto provided they fall within the scope of the appended claims.

What I claim is:

1. A toolholder including a post having a horizontal aperture formed therethrough adjacent one side thereof, said post being horizontally split from said aperture to its opposite side, the split portions of the post having aligned openings formed therethrough, a bolt extending through one pair of aligned openings having a nut on its underside for securing the post upon a rest, a bushing extending between the head of the bolt and the top of the lower split portion through the opening in the upper split portion of the post through which said bolt extends to prevent said split portions being drawn together when the bolt is tightened, a screw in a second pair of aligned openings in threaded engagement with the opening in the lower split portion through which it extends adapted to draw said split portions and opposite sides of the aperture together, and a tool supporting member including a shank, the latter extending through said aperture and being held immovable therein by said bolt.

2. A toolholder including a post having a horizontal aperture formed therethrough adjacent one side, the post being split horizontally from the aperture to its opposite side, the two split portions having vertically aligned openings therethrough, a fastening means including a bolt extending through both said openings having a top at the upper end and a nut at the lower end for securing the post upon a rest, a bushing in the opening in the upper split portion around the upper part of the bolt and against the top of which the top of said bolt bears, said bushing bearing against the lower split portion for preventing the upper split portion being drawn down toward the lower split portion when said fastening means is tightened, a tool supporting member in the post aperture, and means for drawing the split portions of the post toward one another to hold the supporting member immovable.

HOMER C. CLATFELTER.

REFERENCES CITED

The following references are of record in the file of this patent:

UNITED STATES PATENTS

| Number | Name | Date |
|---|---|---|
| 643,713 | Converse | Feb. 20, 1900 |
| 987,233 | Ihsen | Mar. 21, 1911 |
| 1,022,760 | Stoecklin | Apr. 9, 1912 |
| 1,314,911 | Stephenson | Sept. 2, 1919 |

FOREIGN PATENTS

| Number | Country | Date |
|---|---|---|
| 136,081 | Great Britain | Dec. 11, 1919 |